United States Patent

[11] 3,633,287

| [72] | Inventors | Fitz A. Squires;<br>Sophie Squires, both of 444 Beach 54 Street, Arverne, N.Y. 11692 |
|---|---|---|
| [21] | Appl. No. | 35,054 |
| [22] | Filed | May 6, 1970 |
| [45] | Patented | Jan. 11, 1972 |

[54] NUMERICAL BASE SYSTEMS TEACHING DEVICE
2 Claims, 2 Drawing Figs.

| [52] | U.S. Cl. | 35/33 |
|---|---|---|
| [51] | Int. Cl. | G06c 1/00 |
| [50] | Field of Search | 35/32, 33 |

[56] References Cited

UNITED STATES PATENTS

| 1,532,011 | 3/1925 | Williamson | 35/33 |
|---|---|---|---|
| 2,646,631 | 7/1953 | Lazar | 35/33 |
| 3,455,034 | 7/1969 | Schott | 35/33 |
| 2,457,332 | 12/1948 | Wade et al. | 35/33 |

FOREIGN PATENTS

| 46,993 | 11/1909 | Switzerland | 35/33 |
|---|---|---|---|

Primary Examiner—Wm. H. Grieb
Attorney—Richard A. Dannels, Jr.

ABSTRACT: A device for teaching numerical base systems comprises a frame, a plurality of vertically disposed rods, a plurality of counters mounted on each of the rods to form parallel rows, and means removably mounted within the frame for separating the counters into at least two groups of equal counters in each row. For example, by providing the device with 15 counters in each row and mounting two separator bars on the rods to separate the counters in each row into groups of 10, three and two, radices of 10, three and two can be simultaneously compared in order to almost instantaneously teach pupils the principles of base systems other than radix 10.

PATENTED JAN 11 1972 3,633,287

INVENTORS
FITZ A. SQUIRES
BY SOPHIE SQUIRES

Richard A. Donnell Jr.
ATTORNEY

NUMERICAL BASE SYSTEMS TEACHING DEVICE

BACKGROUND OF THE INVENTION

1. Field of the Invention

The present invention is directed to an educational device for teaching pupils to use base systems other than the universally used decimal system. More particularly, this invention is directed to a teaching device which is a unique modification of the abacus for teaching pupils addition, subtraction, multiplication, and division in base systems other than base 10.

Since the dawn of the computer and space ages, school systems from Grade 1 throughout the country have been incorporating into their curriculum what has been termed the new math which includes instruction in converting from one base system to another. Such instruction is important from an industrial and technological point of view, since computers utilize a language based on radix two. In addition, modern educators have found that this instruction enables them to instill in the pupils a deeper understanding and appreciation of our base 10 system as well as to provide pupils with a good mental discipline.

2. Description of the Prior Art

The abacus has been used since ancient times and is still widely used in China in the form of the suan pan and in Japan in the form of the soroban. The Chinese suan pan comprises a frame, parallel spaced rods, 13 rows of counters or beads strung on the rods with a separator bar fixedly attached to the sides of the frame to divide the abacus into five beads in each row in the lower portion and two beads in each row in the upper portion of the abacus. Each bead in the lower portion is equivalent to a given unit value and each bead in the upper portion is equivalent to five times the given unit value of the beads in the lower portion. These prior art devices are all based on the decimal system. Because of the increased interest in other base systems, there is a need for versatile device which can be easily adapted to teaching these other systems.

SUMMARY OF THE INVENTION

The present invention provides such a device which comprises in combination, a frame, a plurality of vertically disposed rods mounted within the frame and forming spaced rows, a plurality of counters mounted on each of the rods for sliding movement relative thereto, and means removably mounted within the frame for separating the counters into at least two groups of equal counters in each row whereby a base system arranged in one group can be compared to a base system arranged in at least one other group. The means can comprise a plurality of stoppers that are removably mounted on the rods between the counters in each row or at least one separator bar that is removably mounted on the rods between the counters in each group. For example, the comparative group contains nine or 10 counters in each row and the other group contains two or more counters in each row. The group for comparison purposes represents the base 10 system. Only nine counters are required per row in the radix 10 since one shifts to the left from row to row as one reaches nine counters in any given row. However, it has been found that the comparative group that contains 10 counters per row is much easier to understand and to compare with another numeration system represented by the other group of counters.

Clip means can be removably mounted on the rods for preventing vertical movement of the counters. Thus, the counters that are moved to the separator bar or to the top of the frame to represent a given number in a given base system can be secured in place and the frame can be lifted into a vertical position for classroom presentation without having the counters slide back to their respective rows.

Adjacent rows of counters on the parallel rods can be of contrasting colors to aid in distinguishing between, for example, the units, tens, hundreds, thousands, ten thousands, hundred thousands, millions, ten millions, hundred millions, and billions in the decimal system. Similarly, a separate color code can be devised for the counters in excess of 10 in each row to aid in distinguishing between the numerical places of the other numeration systems.

PREFERRED EMBODIMENT OF THIS INVENTION

Figure 1:
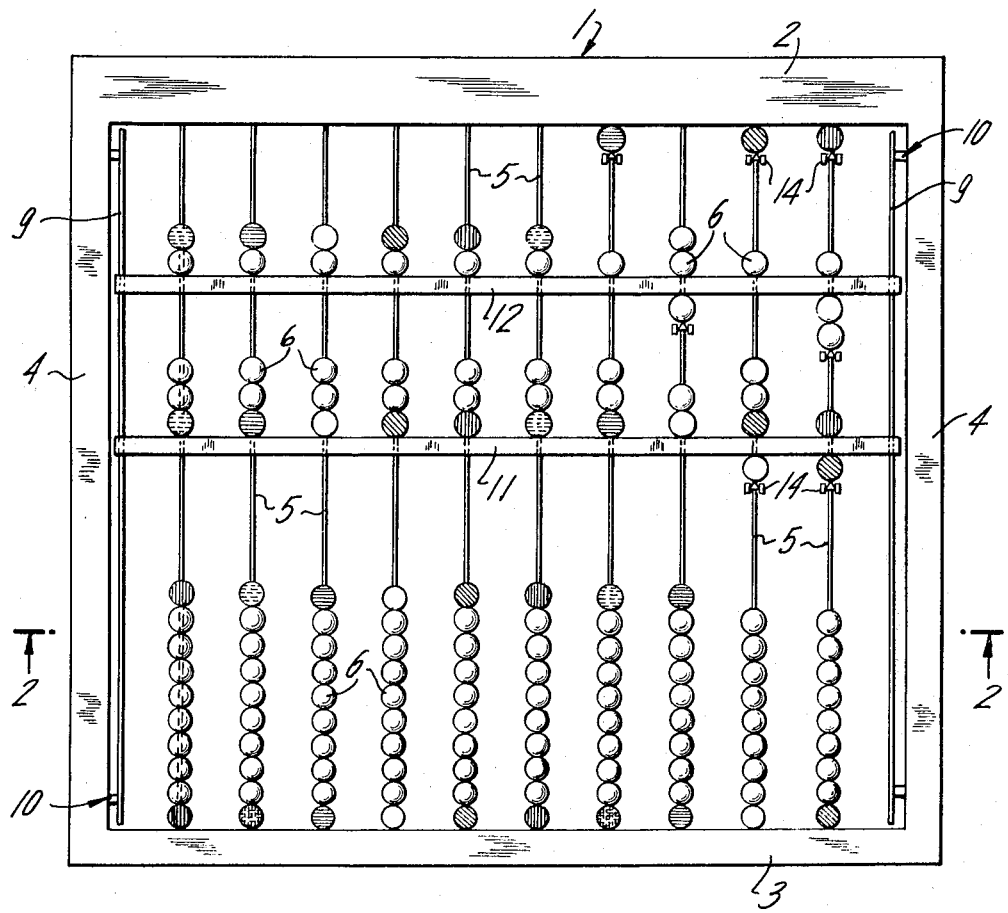
FIG. 1 is a view in front elevation of the device embodying the preferred features of the present invention.
Figure 2:
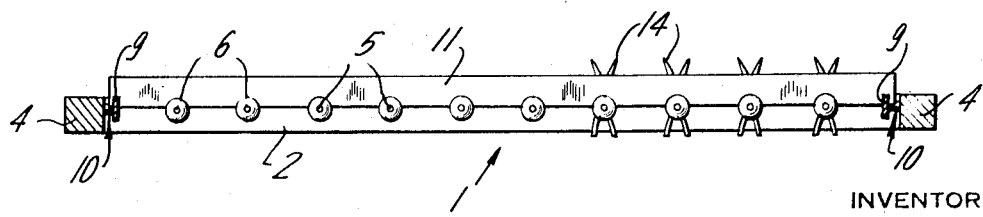
FIG. 2 is a sectional view taken along the line 2—2 in FIG. 1.

In accordance with a preferred embodiment of this invention, there is provided a device for teaching numerical base systems in combination, a substantially rectangular frame, a plurality of vertically disposed rods mounted within the frame and forming spaced rows, at least 15 counters mounted in equal amounts on each of the rods for sliding movement relative thereto, each of the two rails fixedly attached adjacent to two sides of the frame to form a track, and at least one separator bar removably mounted between the rails to separate the counters in each row into one group of nine or 10 counters each and at least one other group of the remaining counters in each row.

The device of the present invention, as illustrated by the preferred embodiment shown in the drawing includes a rectangular shaped frame 1 which comprises upper bar 2 and lower bar 3 and sides 4. Frame 1 can be constructed from any suitable material such as metal, plastic, wood and the like, and can be made to any desired size.

A plurality of spaced, parallel rods 5 are positioned between upper bar 2 and lower bar 3. Preferably rods 5 are metal and 10 in number. When the device is properly assembled there are a plurality of counters 6, with 15 being shown, slideably mounted on each of rods 5. Each of two rails 9 are fixedly attached to each of sides 4 of frame 1 by connection means 10 to provide a track on which separator bars 11 and 12 are placed. Connection means 10 comprises a spacer and a blot or screw mounted in side 4. Separator bars 11 and 12 are slideably positioned between the two groups of counters 6 with intermediate points along bars 11 and 12 in contact with each of rods 5. Alternatively, separator bars 11 and 12 can be grooved where they contact the rods. This eliminates the necessity of the rails and connection means. However, it has been found that the rails provide a much more stable track upon which to slide the separator bars 11 and 12 than the grooved bars. In addition, the device as illustrated in FIG. 1 is simpler to manufacture than one in which the separator bars are grooved. As another alternative, each end of separator bars 11 and 12 can contain a strip of magnetic material (not shown) which will cause the separators 11 and 12 to adhere to rails 9. As illustrated separator bar 11 divides counters 6 in each row into groups of 10 and five and separator bar 12 further divides the group of five counters 6 into groups of three and two counters per row. Thus, the base system of 10 can be simultaneously compared to base systems of three and two.

The counters in the 10 rows each have a value depending on the base system to be used as represented by the following equation:

$$v = b^{r-1}$$

where:

$v$ is the value of the given counter, $b$ is the base system to be used, and $r$ is the number of the row starting with row 1 at the right side of frame 1. For example, in the base three system, each counter in the third row has a value of 9, i.e., $v = 3^{3-1} = 9$.

The following example illustrates the principle involved in using the device of this invention for teaching the numeration systems. In the decimal system, i.e., the lower group of counters 6, the number 11 can be arranged by sliding one of the units counters and one of the tens counters to separator bar 11. Clips 14 are used to hold the two counters 6 to separator bar 11 so that frame 1 can be placed in a vertical position for classroom instruction without downward movement of counters 6. The number eleven can be obtained in the tertiary system by using the middle group of counters in frame 1. One first slides two of the units counters, none of the threes counters, and one of the nines counters, i.e., the counters in the third row from the right, to separator bar 12. One reads the number directly from the device as $102_3$. To obtain this number in the binary system, the top group of counters in frame 1 is used. One slides one of the units and one of the twos counters, none of the fours counters and one of the eights counters to upper bar 2 to obtain $1011_2$.

The device of the present invention enables one to arrange the counters for a calculation in the base 12 system by simply removing separator bars 11 and 12 from frame 1 and placing bar 11 between the counters so that there are 12 counters in each row between bar 11 and frame 1. The number $123_{10}$ can readily represented as a number in the base 12 by sliding three of the units counters and 10 counters from the next row of counters on the left up to separator bar 11. The number is visually illustrated without the necessity of making up a different symbol as is required if you write the number. For example, the symbol "T" is used to represent 10 12's so that $123_{10}$ would be written in the base 12 system as $T3_{12}$.

In order to greatly simplify the remaining discussion, to illustrate the device of this invention all of the counters within frame 1 have been designated by a color and will hereinbelow be identified by that color. As shown on FIG. 1, starting from the counters on the right of frame 1, the units counters are green, the tens counters are white, the hundreds counters are blue, the thousands counters are yellow, and the ten thousands counters are red. The colors used in the first five rows are repeated in the remaining five rows. The counters 6 between separator bar 11 and bar 12 and between separator bar 12 and upper bar 2 are separately color coded to more readily distinguish the numbers arranged in some other numeration system with the numbers arranged between lower bar 3 and separator bar 11 to represent the decimal system.

The device of this invention serves as a useful tool in learning to multiply in the various base systems. The answer obtained in one base system can readily be compared to an answer in another system, especially an answer in the decimal system. For example, 15×23 is calculated be separating the number into a series of simple multiplications and adding the product, i.e., 15×20 plus 15×3. To illustrate on the device shown in FIG. 1, one slides three blues to bar 11 for 15×20 and four whites and five greens to bar 11 for 15×3 for a total of $345_{10}$. To multiply using the tertiary system one first converts the multiplier 15 and the multiplicand 23 each to the base three on the teaching device. The multiplier on the device is represented by one white and two of the greens moved to bar 12 and read as $120_3$. The multiplicand is shown as two whites, one green and two reds for $212_3$. Multiplication of these numbers in the tertiary system is similar to multiplying in the decimal system. Breaking down the multiplications into a series of simple multiplications results in $0\times 212_3$, $20_3\times 212_3$ and $100_3\times 212_3$. The product of the first multiplication is, of course, zero. The multiplier of $20_3$ means that one moves from the reds to the greens row of the counters and adds $212_3$ plus $212_3$. To arrange $212_3$ once on the device, two blues, one white and two greens are moved to bar 12. After the second time $212_3$ is arranged on the device there appears the following: one yellow, two blues, no whites, one green and no reds. In arranging the number in the tertiary one must continually exchange three counters in one row for one counter in the adjacent row to the left. The multiplier of $100_3$ means the one moves from the greens row to the whites row and adds in $212_3$ to the number already in place. The final answer is not shown on the device as: one red, one yellow, no blues, two whites, one green, and no reds, i.e., $110210_3$. To check this result one simply converts the $345_{10}$ product to the tertiary system of the device.

Division can also be compared in the various base systems on this device. In this example $118_{10}$ is the divisor and $3428_{10}$ is the dividend. In the decimal system the dividend is arranged by sliding three yellows, four blues, two whites, and eight greens into place. The object is to subtract $118_{10}$ from the $3428_{10}$ an even number of times to arrive at the quotient with the remainder being the number represented by the remaining counters on the device. In practice one immediately subtracts $20\times 118_{10}$ or $2360_{10}$ from $3428_{10}$ leaving one yellow, no blues, six whites, and eight greens or the number $1068_{10}$. Next one can subtract $5_{10}\times 118_{10}$ or $590_{10}$ from $1068_{10}$ leaving four blues, seven whites, and eight greens for $478_{10}$. Finally one simply continues to subtract 118 from the number on the device until less than $118_{10}$ remains on the device. One must remember the number of times $118_{10}$ is subtracted from the $490_{10}$. This results in four subtractions and a remainder of six greens. Thus, the whole number of times $118_{10}$ goes into $3428_{10}$ is $20_{10}$ plus $5_{10}$ plus $4_{10}$ or $29_{10}$ with a remainder of $6_{10}$. To illustrate division in the tertiary system, a simpler example is used keeping in mind the same principles that are involved for the more difficult problems. The divisor is $7_{10}$ or $21_3$ and the dividend is $46_{10}$ or $1201_3$. In the decimal system the quotient is $6_{10}$ with a remainder of $4_{10}$. In the tertiary system $1201_3$ is arranged on the device with one blue, two whites, no greens and one red. The division of $21_3$ is then subtracted from the dividend of $1201_3$ an even number of times. Separator bar 12 can be arranged in such a fashion so as to have two groups of three counters per row. In this arrangement one of the groups can be used to tally the even number of times $21_3$ goes into $1201_3$ and the other group to record the remainder. The group chosen as the tally automatically reads the quotient. In this example, the quotient is recorded as two whites or $20_3$ with a remainder recorded as one white and one red or $11_3$.

While only the preferred embodiments of the present invention have been illustrated, it is apparent that variations and modifications may be made without departing from the spirit and scope of the invention as disclosed herein and as defined in the appended claims.

We claim:

1. A device for teaching numerical base systems in combination, a substantially rectangular frame, a plurality of vertically disposed rods mounted within said frame and forming spaced rows, a plurality of counters mounted in equal amounts on each of said rods for sliding movement relative thereto, each of two rails fixedly attached adjacent to two sides of said frame to form a track, a first separator bar removably mounted between said rails to separate said counters in each row into a first group of at least nine counters each and a second group of at least five counters in each row, a second separator bar removably mounted between said rails to separate the second group into two additional groups each group containing a finite number of counters, and a plurality of clip means removably mounted on said rods for preventing vertical movement of said counters whereby a base system arranged in the first group can be simultaneously compared to different base systems arranged in the two additional groups.

2. The device of claim 1 wherein said rails are composed of a material that adheres to magnetic material and said first and second separator bars each contain such magnetic material.

* * * * *